United States Patent Office 3,578,401
Patented May 11, 1971

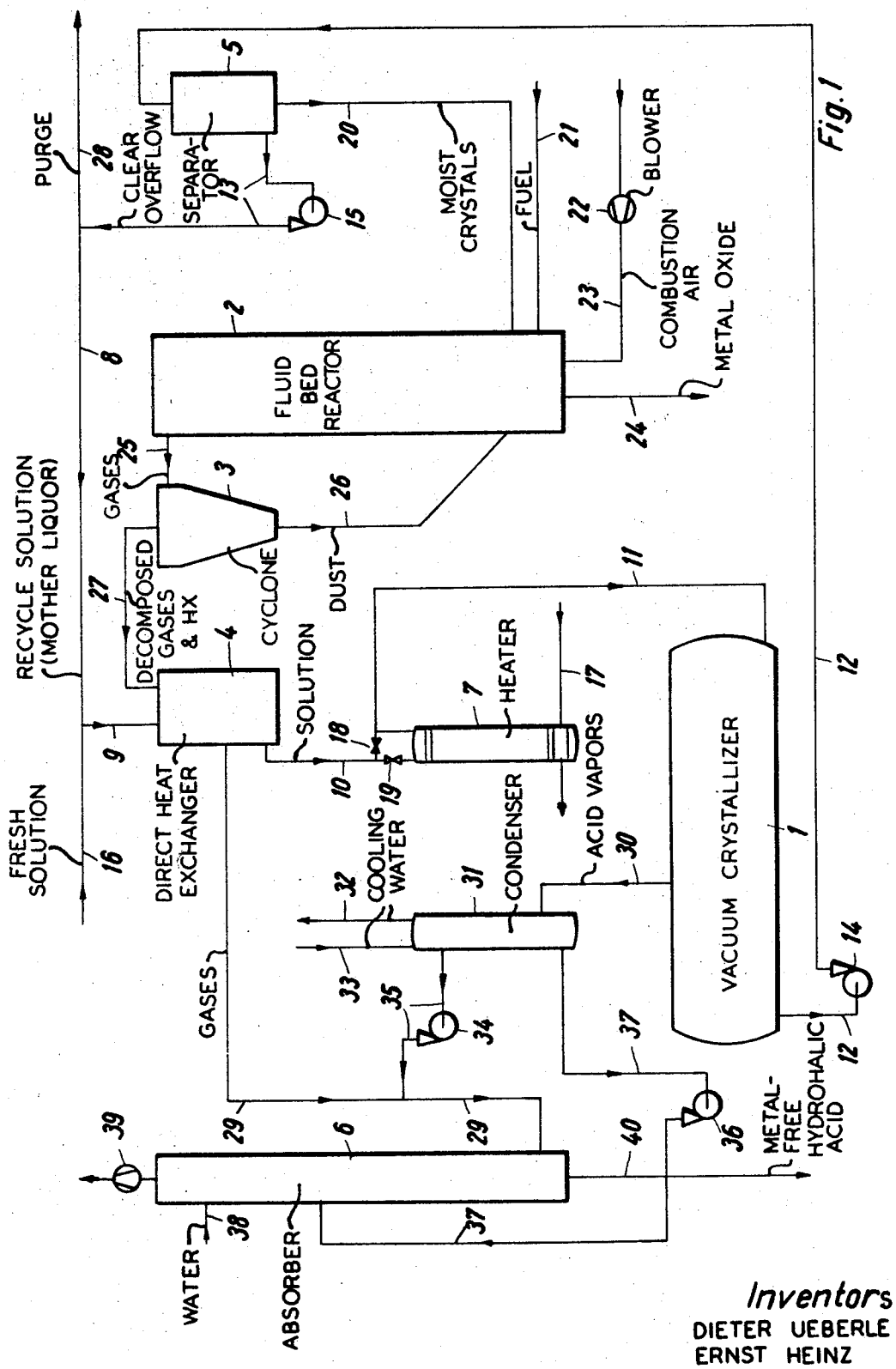

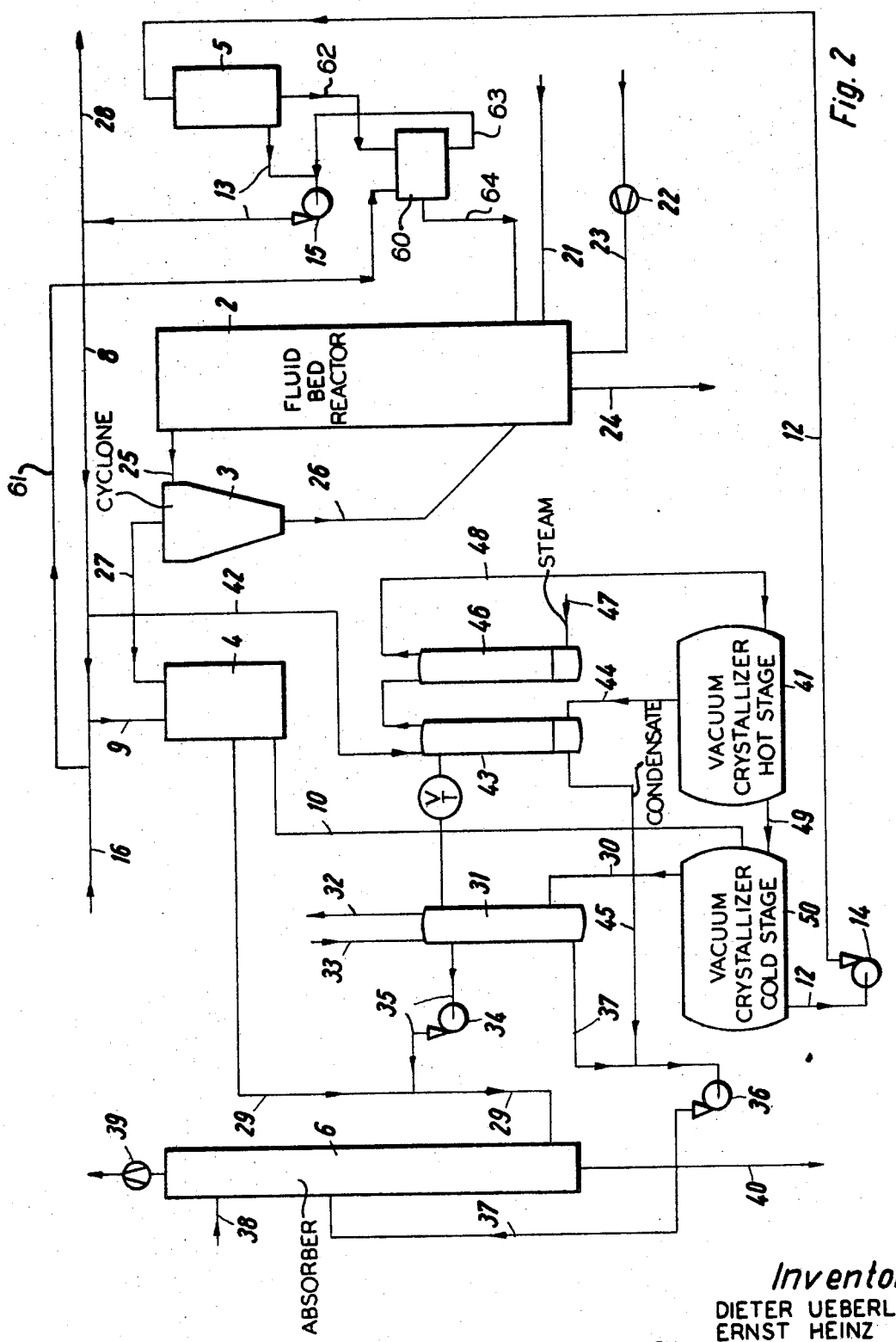

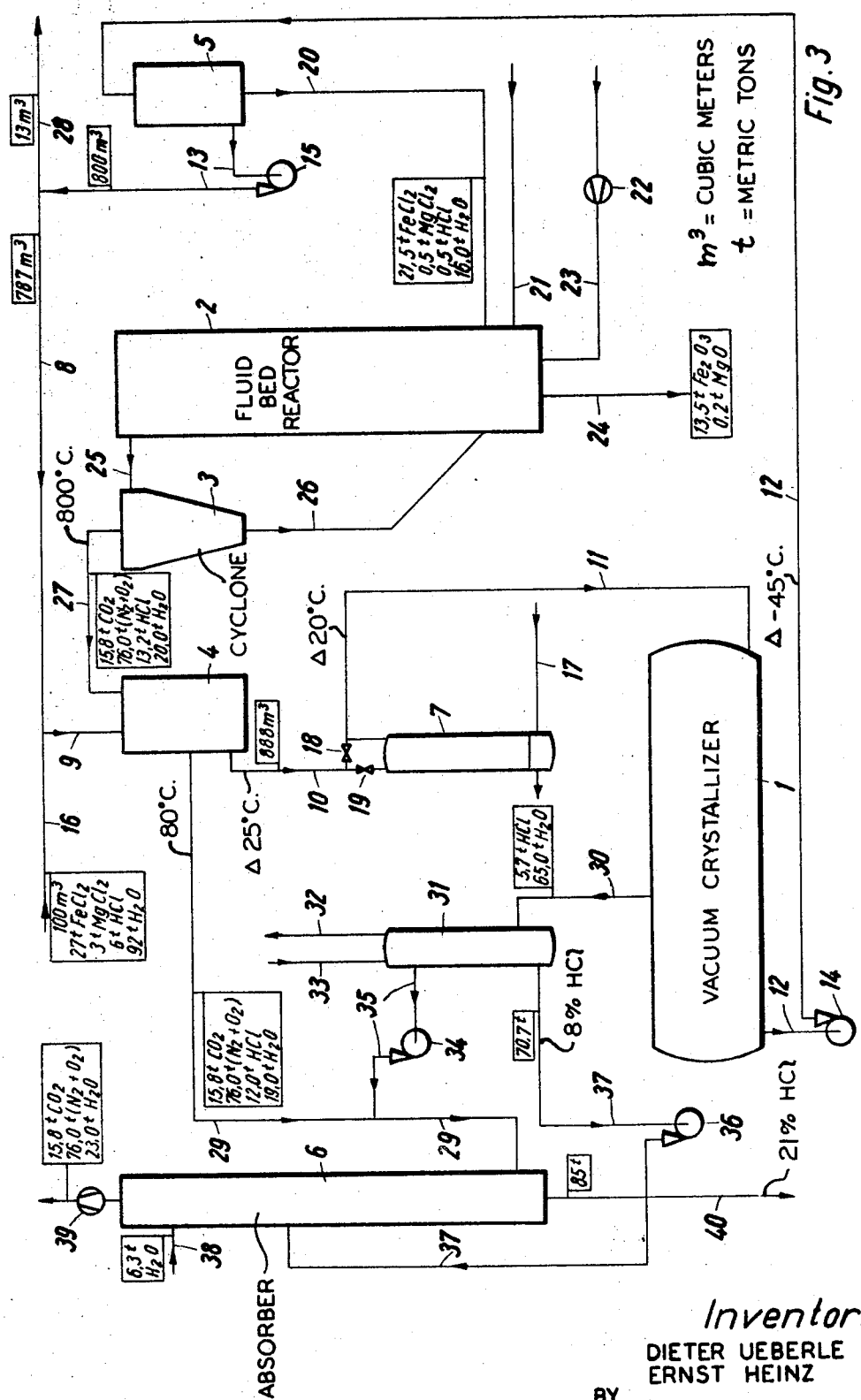

3,578,401
PROCESS OF PRODUCING HYDROHALIC ACIDS
AND METAL OXIDES
Dieter Ueberle and Ernst Heinz, Frankfurt am Main,
Germany, assignors to Metallgesellschaft Aktiengesellschaft, Frankfurt am Main, Germany
Filed Jan. 29, 1969, Ser. No. 794,964
Claims priority, application Germany, Jan. 31, 1968,
P 16 67 195.7
Int. Cl. C01b 7/00, 7/08
U.S. Cl. 23—154                                    13 Claims

ABSTRACT OF THE DISCLOSURE

A process of producing hydrohalic acid and metal oxide from a metal halide solution, wherein metal halide is precipitating from the metal halide solution in a precipitation step, and the precipitated halide is separated from the mother liquor and is thermally decomposed with oxygen, steam or a mixture thereof, to yield a hot hydrohalic acid containing gas and metal oxide, characterized in that:

(a) mother liquid is recycled to the precipitation step,
(b) said recycle mother liquor, prior to the precipitation step being subjected to direct heat exchange with said hot hydrohalic acid-containing gas,
(c) the mother liquor recycle stream is recycled so often that the throughput of recycle mother liquor per unit of time amounts to 4 to 20 times the amount of metal halide solution which is fed to the process per unit of time.

BACKGROUND

The present invention relates to a process of recovering or producing hydrohalic acids and metal oxides by a decomposition of halides which are available as solutes and can be thermally decomposed with the aid of oxygen or air and/or water.

A number of processes are known in which a hydrogen halide solution, preferably hydrochloric acid, is used as a decomposing agent, e.g., in the decomposition of ilmenite, alumina, etc. The reaction products include halides, which are dissolved in dilute acids, because a complete reaction of the acid which is supplied is normally impossible. These solutions contain also impurities, which come from the decomposed material. The profitability of such decomposing processes depends on the economic recovery of the acid which is supplied.

In connection with the regeneration of pickling liquors which contain hydrochloric acid, a plurality of processes for processing pickling solutions which contain iron chloride have been developed (see "Stahl und Eisen" 84, 1841 to 1843 (1964)). In the spray roasting process, the decomposition results in the formation of iron oxide dust owing to the short residence time in the reactor. In order to produce a coarse-grained iron oxide which can well be handled and contains much less chlorine, the decomposition may be carried out in a fluidized bed reactor at approximately 800° C. These processes which are known for the regeneration of pickling liquors which contain hydrochloric acid cannot be generally used to process halide solutions because water is evaporated in only one stage so that the economy of the process is not sufficient. The utilization of the waste heat in another stage to increase the concentration of the solution makes sense only if the solution to be processed, such as pickling liquor, is obtained in a highly diluted state. The solution cannot be concentrated below some percent below the saturation concentration because there is otherwise the danger of a precipitation of salt crystals. In equipment having a wall lining, such precipitation in conjunction with the high temperature, would rapidly result in a formation of crusts at the inlet. Even when the waste heat can be fully utilized in this way, a large amount of water enters the reactor and must be evaporated and leaves the decomposition reactor together with the recovered hydrogen halide. Owing to the high steam content of the decomposed gases, only acids having a relatively low hydrogen halide content can be produced in a single-stage adiabatic absorber. Measures intended to produce higher concentrations involve considerable costs.

For the regeneration of pickling liquors which contain hydrochloric acid, a process has previously been used in which the pickling liquor was contacted with the decomposing gases in a multiple-deck furnace. The crystallization of the iron chloride was initiated in the absorber and terminated in a crystallizing cooler. The resulting crystals were separated and decomposed in the multiple-hearth roaster. The mother liquor constituted the regenerated pickling acid. A pure acid, which is free of metal, cannot be produced by this process so that the latter can be used only for regenerating pickling acid. It is another disadvantage that only fine-powdered iron oxide is produced. In this process, the separated crystals could not be decomposed in a fluidized bed reactor because the latter produces much hotter decomposed gases and thicker crusts would be formed in the absorber.

THE INVENTION

It is an object of the invention to produce an economic process for producing hydrohalic acid which is substantially pure, i.e., free of metal, and metal oxides from solutions of thermally decomposable metal halides. The decomposition is preferably effected in a fluidized bed reactor so that a coarse-grained metal oxide can be obtained.

Thus, the invention provides a process of producing hydrohalic acid and metal oxide from a metal halide solution, wherein the metal halide is precipitated from the metal halide solution in a precipitation step, and the precipitated halide is separated from the mother liquor and is thermally decomposed with oxygen, steam or a mixture thereof to yield a hot hydrohalic acid-containing gas and metal oxide. The source of oxygen can be air. The use of oxygen, air and/or steam, is known in the art. The process of the invention is characterized in that mother liquor is recycled to the precipitation step. The recycle mother liquor, prior to the precipitation step is subjected to direct heat exchange with the hot hydrohalic acid-containing gas. To this end the mother liquor recycle stream is recycled so that the throughput of the recycle liquor per unit of time amounts to 4 to 20 times the metal halide solution fed to the process per unit of time. Desirably, said precipitation is effected by vacuum evaporation. Further, it is desirable to add the metal halide feed solution to the mother liquor and subject the resulting mixture to said direct heat exchange. The hot hydrohalic acid-containing gas can be at a temperature of about 600–1000° C., preferably 700–900, for example 800° C.; the gas can be cooled in the indirect heat exchange to below about 100° C., preferably to about 80° C.

According to the present invention, the solution of the halides to be decomposed, generally an aqueous solution of halides in a hydrohalic acid, e.g. hydrochloric acid, is added to the recycled mother liquor which has a throughput of 4 to 20 times the amount of the halide solution. The circulating solution together with the added fresh solution is then subjected to a direct heat exchange with the hot decomposition gases, from which dust has suitably been removed. In this heat exchange, the decomposition gases are cooled to, e.g. about 80° C., whereas they have initially a temperature of, e.g. about 800° C., when a fluidized-bed decomposition reactor is employed. During this heat exchange, the circulating solution is heated by about 10–50° C. The temperature of the heated circulating solution remains below the boiling point of the solution so that no water is evaporated from the circulating solution. Such evaporated water would dilute the cooled decomposed gases entering the absorber. Because the solubility of the halides increases as the temperature increases, there is no danger of a precipitation of crystals upon the direct contact of the hot decomposed gases with the circulating solution. Before entering the vacuum evaporator, the heated solution may be heated further, e.g., by an indirect heat exchange with steam or by another heat carrier. The heat which is supplied to the circulating solution by the direct heat exchange and any additional indirect heat exchange is withdrawn from it in the vacuum evaporator by the evaporation of water. The halides which are introduced into the circulating solution are precipitated as crystals in the vacuum evaporator. It is suitable to minimize the amount of water which is supplied into the reactor with the crystals. For this reason, the still lacking heat energy should be supplied by an indirect heat exchange with live steam to the circulating solution before the same enters the vacuum crystallizer, provided that the heat quantity from the decomposed gases is not sufficient.

The crystals which are produced by vacuum evaporation are separated from the circulating solution, e.g., in a centrifuge, and are thermally decomposed in a decomposing furnace with addition of oxygen or air to produce hydrogen halide, e.g. HCl, and metal oxide. The thermal decomposition is suitably carried out in a fluidized bed reactor. Part of the resulting metal oxide is suitable employed as bed material.

The circulating solution from which the crystals have been removed is recirculated to the process.

The vapor which is produced by the vacuum evaporation is condensed and the condensate is passed into the absorber, which also receives the cooled decomposition gases. A surface condenser is suitable employed for the condensation. The surface condenser is vented into the absorber in order to ensure that any traces of hydrogen halide in the exhausted air will not enter the atmosphere.

The composition of the circulating solution will adjust itself after some operating time if water or halide solution is first used as circulating solution when the plant is started. During steady state operation, the circulating solution is a solution that is virtually saturated with hydrogen halide and the metal halide to be decomposed or the mixed metal halides to be decomposed.

If the fresh solution to be added to the circulating solution contains the halide to be decomposed as well as impurities, e.g., other metal halides having a relatively lower concentration, circulating solution can be withdrawn as a purge at a low rate after the crystals have been separated. The impurities which are thus removed from the cycle can have the same mass as those which are supplied in the fresh solution. It is thus prevented that the circulating solution becomes saturated with the impurity so that the latter would crystallize. The crystals may be washed to reduce the impurities which adhere to the separated crystals. The fresh solution to be added to the circulating solution is desirably used to wash or prewash the crystals because this practice will not result in an additional supply of water into the cycle and a removal of halide from the cycle. The withdrawal of circulating solution from the cycle at a low rate results in the production of an oxide which contains only a very small amount of the impurity.

The solution which has been discarded from the cycle may also be processed to produce a hydrogen halide solution and recover mixed oxides. This processing may be carried out from time to time in the same plant or in a small parallel plant, which is desirably operated also according to the process according to the invention.

According to the invention, the solution which contains the halide to be decomposed is added to the recycled mother liquor which has a throughput of 4 to 20 times the amount of the halide solution. The rate at which liquid is withdrawn from the cycle is generally 0 to 0.3 times the rate at which fresh solution is added to the cycle, depending on the content of impurities. If the fresh solution contains no impurities, liquid need not be withdrawn from the cycle. In most cases, the rate A at which the fresh solution is added, the rate B at which the solution is circulated, and the rate C at which the solution is discarded from the cycle is $A:B:C = 1:10:0.1$.

The economy of the process may also be improved in that vapor from the hot stages of the vacuum crystallizer is used to preheat part of the cold circulating solution by an indirect heat exchange if the temperature difference is sufficiently high for a utilization of the steam.

The invention will now be explained more fully with reference to the two diagrammatic and illustrative drawings and an example.

FIG. 1, FIG. 2, and FIG. 3 are flow sheets for the process of the invention; FIG. 1 and FIG. 2 being alternative embodiments, and FIG. 3 being the flow sheet of FIG. 1 with appended material balance figures for the example, infra. Like reference characters refer to corresponding parts.

FIG. 1 is a flow diagram of a plant for carrying out the process according to the invention in conjunction with a thermal decomposition carried out in a fluidized bed reactor. The plant consists essentially of the vacuum crystallizer 1, the fluidized bed reactor 2 provided with the cyclone 3, a heat exchanger 4, the mechanical separator 5 and the absorber 6. The heater 7 is disposed between the heat exchanger 4 and the vacuum crystallizer 1. The circulated solution is circulated through conduits 8, 9, the heat exchanger 4, the conduit 10, the heater 7, the conduit 11, the vacuum crystallizer 1, the conduit 12, the mechanical separator 5 and the conduits 13. Pumps 14 and 15 for circulating the circulating solution are incorporated in the conduits 12 and 13. The fresh solution is supplied through conduit 16 into the cycle. The heat exchanger 4 consists suitable of a venturi heat exchanger so that even the finest dust particles will be removed from the decomposed gases. In that heat exchanger, the liquid supplied through conduit 9 is heated by a direct heat exchange with the decomposed gases, from which dust has been removed. The heated circulating solution is supplied through the conduit 10 into the heater 7, in which it is heated further by indirect heating. The indirect heating is effected by live steam, which is supplied to the heater through the pipeline 17; the circulating solution leaving the heater is at a temperature which is below the boiling point of the solution. If an additional heating in the heater 7 is not required, the heater 7 is removed from the cycle. To this end, the bypass valve 18 is opened and the valve 19 is closed. The hot circulating solution enters the crystallizer 1, in which it is cooled in a vacuum, preferably in a plurality of stages. The halides, and possibly water of crystallization in an amount which corresponds to the temperature, are thus crystallized and are discharged with the circulating solution through conduit 12 and separated from the circulating solution in the mechanical separator 5, which consists preferably of a centrifuge. Whereas the clear overflow is supplied by the pump 15 through the conduits 13, 8 and 9 to the venturi heat exchanger 4, the moist crystals are supplied through conduit 20 into the fluidized bed reactor 2, where they are decomposed at the required temperature, preferably at 800° C. The reactor may be heated with liquid, gaseous or solid fuel, which is supplied to the reactor through conduit 21. Just as the decomposition, the combustion is preferably carried out in a fluidized bed. The fluidizing and combustion air which is required is supplied to the reactor by a blower 22 through the conduit 23. Bed material at a rate at which metal oxide is produced is continuously or intermittently withdrawn from the reactor through conduit 24. From the reactor 2, the decomposed gases together with the produced hydrogen halide (HX) pass through the conduit 25 into the cyclone 3, where the entrained dust particles are separated and returned by the dust-returning conduit 26 into the reactor 2, where they can continue to grow. When most of the dust has been removed from the decomposed gas, the latter passes through conduit 27 into the venturi heat exchanger 4, where it is subjected to a direct heat exchange with the circulating solution, to which fresh solution has previously been admixed through conduit 16 and from which a small portion or purge has been withdrawn through conduit 28. The circulating salt solution is heated with utilization of the sensible heat of the decomposed gases and the decomposed gases are cooled at the same time. The cooled decomposed gases are saturated with water in dependence on temperature and flow together with the hydrogen halide through conduit 29 into the absorber 6.

The acid vapors produced in the vacuum crystallizer 1 are passed through the conduit 30 into the surface condenser 31 and condensed therein. The surface condenser is cooled by cooling water, which is supplied through conduits 32 and 33. The surface condenser is exhausted by the exhaust blower 34 through conduits 35 and 29 into the absorber 6 in order to ensure that any hydrogen halide traces present in the exhausted air will not enter the atmosphere. The acid condensate formed in the surface condenser 31 is charged by the condensate pump 36 through the conduit 37 to the absorber 6 at a point which corresponds to the hydrogen halide concentration. The still lacking absorption water is supplied to the top of the absorber through the supply conduit 38. The hydrogen halide is separated from the flue gas by adiabatic absorption in the absorber 6. The flue gas which is free of hydrogen halide leaves the absorber at the top and is discharged into the atmosphere by the fan 39. The metal-free hydrohalic acid leaves the absorber at the bottom through the pipeline 40.

FIG. 2 shows a similar plant for carrying out the process according to the invention. Corresponding parts are designated with the same numbers in FIG. 1 and FIG. 2. The plant of FIG. 2 differs from that of FIG. 1 in that the vapors from the hot stage 41 of the vacuum crystallizer are used to preheat a partial stream of the circulating solution. The partial stream of the circulating solution is branched from conduit 8 in conduit 42 and initially enters the indirect heat exchanger 43, which is heated with the vapors from the hot stage 41 of the vacuum crystallizer. The vapors are passed from stage 41 through conduit 44 into the heat exchanger 43, where they are condensed. The condensate is added through conduit 45 to the condensate withdrawn from the colder stage in conduit 37. That partial stream of the circulating solution which has been heated in the indirect heat exchanger 43 is supplied to the further indirect heat exchanger 46, which is heated with steam flowing through conduit 47. That partial stream of the circulating solution which was heated in the heat exchanger 46 almost to the boiling point of the solution enters through the conduit 48 the hot stage 41 of the vacuum crystallizer, in which part of the heat is withdrawn from that partial stream by vacuum evaporation. When the solution has been somewhat cooled, it is passed through conduit 49 into the colder stage 50 of the vacuum crystallizer. The other partial stream of the circulating solution enters through conduit 10 also the colder stage 50 after said other partial stream has been heated in the venturi heat exchanger 4 by the hot decomposed gases from which the dust has been removed. Metal halide leaves separator 5 via line 62 and is passed through washer 60, and then via line 64 passes to reactor 2. A portion of the feed solution is passed through line 61, and is used for the washing. The effluent wash water passes via line 63 to pump 15. This plant has a particularly high economy in operation. In respects other than those described above, it operates in the same manner as described with reference to FIG. 1.

EXAMPLE

An aqueous solution of iron chloride in hydrochloric acid, which contained magnesium chloride as an impurity, was processed to produce iron oxide and 21% hydrochloric acid.

The flow rates of the streams flowing in the various sections of the plant and the composition of said streams are indicated in FIG. 3, in which, with reference to FIG. 1, corresponding parts are designated with like reference characters.

In the venturi heat exchanger 4, the liquid is heated by about 25° C. by the hot decomposed gases, which are at a temperature of about 800° C. and are discharged at a temperature of 80° C. from the venturi heat exchanger through conduit 29. The solution was heated by additional 20° C. in the heater. This required 36 metric tons of live steam per unit of time. The solution was cooled by 45° C. in the vacuum evaporator or vacuum crystallizer 1. 5 metric tons of oil and 75 standard metric tons of air were required to decompose the separated crystals.

The dilute hydrochloric acid discharged at a rate of 70.7 metric tons from the surface condenser 31 had a concentration of 8%. Metal-free hydrochloric acid having a concentration of about 21% was discharged at a rate of 85 metric tons from the absorber 6.

The circulating solution which returns through the conduit 8 was an approximately concentrated aqueous solution of hydrochloric acid and iron chloride and contained magnesium chloride as an impurity. To prevent an increase of the content of magnesium chloride, 13 cubic meters of solution were discharged per unit of time through conduit 28. The processing of the withdrawn solution resulted in mixed oxides consisting of $Fe_2O_3$ and MgO.

What is claimed is:

1. A process of producing hydrochloric acid of high purity and metal oxide from a metal chloride solution with improved heat economy, wherein metal chloride is precipitating from the metal chloride solution in a precipitation step, and the precipitated halide is separated from the mother liquor and is thermally decomposed with oxygen, steam or a mixture thereof, within the temperature range of 600–1000° C., to yield a hot hydrocloric acid-containing, gas and metal oxide, characterized in that:
    (a) mother liquor is recycled to the precipitation step,
    (b) said recycle mother liquor, prior to the precipitation step being subjected to direct heat exchange with said hot hydrochloric acid-containing gas,
    (c) the mother liquor recycle stream is recycled so that the throughput of recycle mother liquor per unit of time amounts to 4 to 20 times the amount of metal chloride solution which is fed to the process per unit of time.

2. Process according to claim 1, wherein said precipitation is effected by vacuum evaporation.

3. Process according to claim 1, wherein said metal chloride solution is added to the mother liquor and the resulting mixture is subject to said direct heat exchange.

4. Process according to claim 2, wherein the vapors produced by vacuum evaporation are cooled to condense condensables contained therein and the resulting condensate is contacted with the effluent hydrochloric acid-containing gas from said direct heat exchange for absorption of hydrochloric acid by the condensate from the gas.

5. Process according to claim 3, wherein the heating by said direct heat exchange is about 10–50° C.

6. Process according to claim 3, wherein after said heating by direct heat exchange, the said mixture is further heated by indirect heat exchange with a heating medium.

7. Process according to claim 1, wherein the precipitated chloride is thermally decomposed in a fluidized bed thereof.

8. Process according to claim 2, wherein the vapor produced by vacuum evaporation are cooled to partially condense condensables contained therein and remaining uncodensed vapors are subjected to absorption to further separate components thereof therefrom.

9. Process according to claim 1, wherein the recycle liquor is an aqueous solution which is substantially saturated with hydrochloric acid and the chloride to be thermally decomposed.

10. Process according to claim 2, wherein the vacuum evaporation is carried out in a plurality of stages each operating at a different temperature and the vapors from a hotter stage are used to heat a partial stream of the recycle liquor.

11. Process ccording to claim 1, wherein said metal chloride solution is an aqueous solution of iron chloride.

12. Process according to claim 11, wherein said precipitation is effected by vacuum evaporation.

13. Process according to claim 12, wherein the recycle is an aqueous solution substantially saturated with hydrochloric acid and iron chloride.

References Cited

UNITED STATES PATENTS

| | | | |
|---|---|---|---|
| 2,155,119 | 4/1939 | Ebner | 23—1 |
| 3,399,964 | 9/1968 | Michels | 23—154 |
| 3,406,010 | 10/1968 | Holderreed et al. | 23—154X |
| 3,440,009 | 4/1969 | Flood et al. | 23—154 |
| 3,442,608 | 5/1969 | Addinall et al. | 23—87X |
| 3,443,991 | 5/1969 | Kremm | 23—154X |

EDWARD STERN, Primary Examiner

U.S. Cl. X.R.

23—1, 87, 152, 200